United States Patent
Panizzolo

(10) Patent No.: US 6,805,210 B2
(45) Date of Patent: Oct. 19, 2004

(54) ENGINE HALF-TROLLEY FOR INDUSTRIAL VEHICLES

(75) Inventor: Fabrizio Panizzolo, Padua (IT)

(73) Assignee: Dana Italia S.p.A., Zona Industriale Arco (IT)

( * ) Notice: Subject to any disclaimer, the term of this patent is extended or adjusted under 35 U.S.C. 154(b) by 0 days.

(21) Appl. No.: 09/955,886

(22) Filed: Sep. 19, 2001

(65) Prior Publication Data

US 2002/0036110 A1 Mar. 28, 2002

(30) Foreign Application Priority Data

Sep. 28, 2000 (IT) ..................................... MI2000A2103

(51) Int. Cl.[7] .............................................. B62D 61/10
(52) U.S. Cl. ................................ 180/24.11; 180/24.08; 180/378; 180/379; 180/371; 180/346; 180/363
(58) Field of Search .......................... 180/24.11, 24.08, 180/361, 371, 378, 379, 245, 248, 343, 346, 347, 363; 74/665 G, 665 GC, 606 R, 607; 475/225, 222; 280/124.129

(56) References Cited

U.S. PATENT DOCUMENTS

| | | | | |
|---|---|---|---|---|
| 967,728 A | * | 8/1910 | Charley | 180/24 |
| 1,707,535 A | * | 4/1929 | North | 180/24.05 |
| 2,098,894 A | * | 11/1937 | Van Doorne et al. | 180/24.05 |
| 2,165,723 A | * | 7/1939 | North | 180/24.05 |
| 2,215,506 A | * | 9/1940 | Hollmann et al. | 180/24.05 |
| 3,450,221 A | * | 6/1969 | Nelson | 180/24.05 |
| 4,064,956 A | * | 12/1977 | Wildey | 180/24.05 |

FOREIGN PATENT DOCUMENTS

| DE | 199908958 A1 | * | 9/2000 |
|---|---|---|---|
| RU | 2019444 C1 | * | 3/1990 |

* cited by examiner

Primary Examiner—Ruth Ilan
(74) Attorney, Agent, or Firm—Hedman & Costigan, P.C.

(57) ABSTRACT

An engine half-trolley (10) of simplified structure for industrial vehicles set at the side of a vehicle chassis and comprising a casing (12) from which there comes out at least one wheel hub (13) for a respective wheel (14), an input shaft (17) to said half-trolley (10) being connected to a differential (16) of the vehicle, in the said half-trolley, between the input shaft (17) and the wheel hub (13), there being provided, in succession, two bevel-gear pairs (18, 19; 21, 23) housed in an arm (15, 115) forming part of the casing (12), in which at least one bottom area of the arm (15, 115), for attachment to the wheel hub (13), has ample bevels (26).

8 Claims, 4 Drawing Sheets

ENGINE HALF-TROLLEY FOR INDUSTRIAL VEHICLES

The present application claims priority to Italian Patent Application No. MI 2000A 002103, filed Sep. 28, 2000.

BACKGROUND OF THE INVENTION

The present invention relates to an engine half-trolley of simplified structure for industrial vehicles, in particular for vehicles with more than one driving wheel.

In certain types of known industrial vehicles used for heavy operations and jobs and in very demanding environmental conditions, such as for deforestation, gathering trunks, work in situations where there is mud or mire, etc., it is necessary to have a secure and sturdy wheel drive to guarantee efficient operation of the vehicle.

For this purpose, there are currently available engine half-trolleys for industrial vehicles, which are driven by a central transmission and which, by means of a series of cascaded gears set inside a casing of the half-trolley, drive the wheels of the vehicle in rotation.

The placing of this series of gears in the casing of the half-trolley means that it is necessary to provide a series of supports, a series of machined seats for installing the various gears, and a certain number of bearings, which in turn entails the need for machining operations of a certain precision; moreover, the assembly operations involve some degree of complexity and delicacy.

In addition, the amount of components inside the casing for a wheel drive of this sort entails the need to keep in store a certain number of spare parts, and this in turn means tied-up capital and problems of storage space.

It should moreover be borne in mind that large-sized industrial vehicles have a number of driving wheels, and hence the amount of components referred to above must be multiplied by the number of wheels on each vehicle, and consequently the aforesaid costs and problems are amplified beyond all proportion.

In addition, the half-trolleys that are currently known and used are of a square shape and present considerable overall dimensions, which lead to difficulties of penetration of the vehicle in muddy and swampy environments.

SUMMARY OF THE INVENTION

A general purpose of the present invention is to provide an engine half-trolley for industrial vehicles that has a structure that is as simple as possible, with a number of components limited to the minimum.

A further purpose of the present invention is to provide an engine half-trolley for industrial vehicles which, albeit simplified, preserves high functionality and practicality also when being assembled or undergoing maintenance.

Finally, yet another purpose of the present invention is to provide an engine half-trolley for industrial vehicles which is particularly compact, which can be set in an industrial vehicle in contained spaces, and can be adapted to particular requirements in the presence of heavy loads.

The above purposes according to the present invention are achieved by providing an engine half-trolley for industrial vehicles set at a side of a vehicle chassis and comprising a casing (12) from which there comes out at least one wheel hub (13) for a respective wheel (14), an input shaft (17) to said half-trolley (10) being connected to a differential (16) of the vehicle, said half-trolley further comprising an arm (15, 115) forming part of said casing (12) wherein said arm (15, 115) has at least two bevels (26, 26') a first bevel (26) located on at least one side of said arm (15, 115) in the area external to said input arm (17) and a second bevel (26') located on at least one side of said arm (15, 115) between said first bevel (26) and said wheel hub (13), wherein within said arm (15, 115) forming part of said casing (12) there is set in succession, between said input shaft (17) and said wheel hub (13), a first ring bevel gear (18), which meshes with a first bevel pinion (19) set at one first end of a continuous transmission shaft (20), said transmission shaft (20) carrying, at its second end, a second bevel pinion (21), which in turn engages with a second ring bevel gear (23) fixed on a shaft (24) connected to said wheel hub (13).

BRIEF DESCRIPTION OF THE DRAWINGS

The characteristics and advantages of an engine half-trolley of simplified structure for industrial vehicles according to the invention will emerge even more clearly and evidently from the ensuing description, which is provided purely by way of non-limiting example, with reference to the drawings, in which.

DETAILED DESCRIPTION OF THE INVENTION

Figure 1:
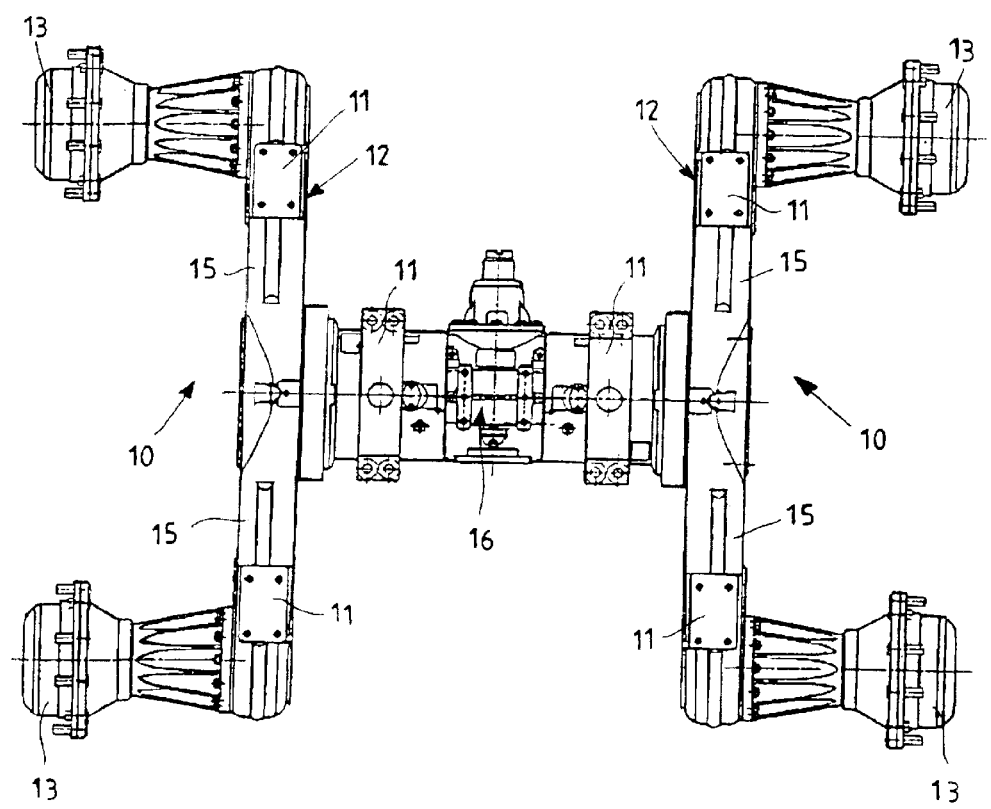
FIG. 1 is a top plan view of an industrial vehicle provided with engine half-trolleys of simplified structure according to the present invention.

With reference to FIG. 1, a top plan view of just one part of the transmission of an industrial vehicle is illustrated, and in particular two engine half-trolleys 10 of simplified structure according to the present invention are shown, which are constrained by means of central and side supports 11 to a vehicle chassis (not shown).

Figure 2:
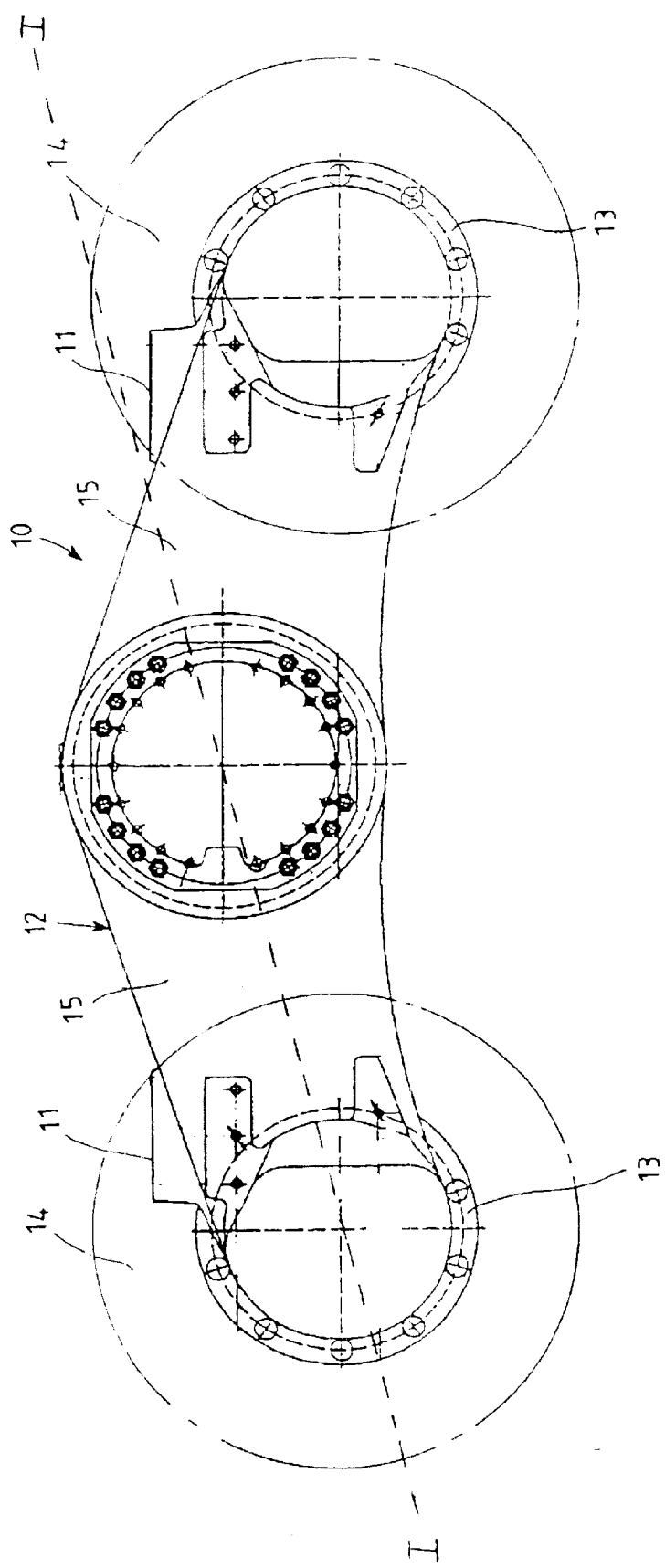
FIG. 2 is a side elevation of an engine half-trolley of simplified structure according to the invention, equipped with wheels (represented by a dashed and dotted line), which may thus be applied to a an industrial vehicle.
Figure 3:
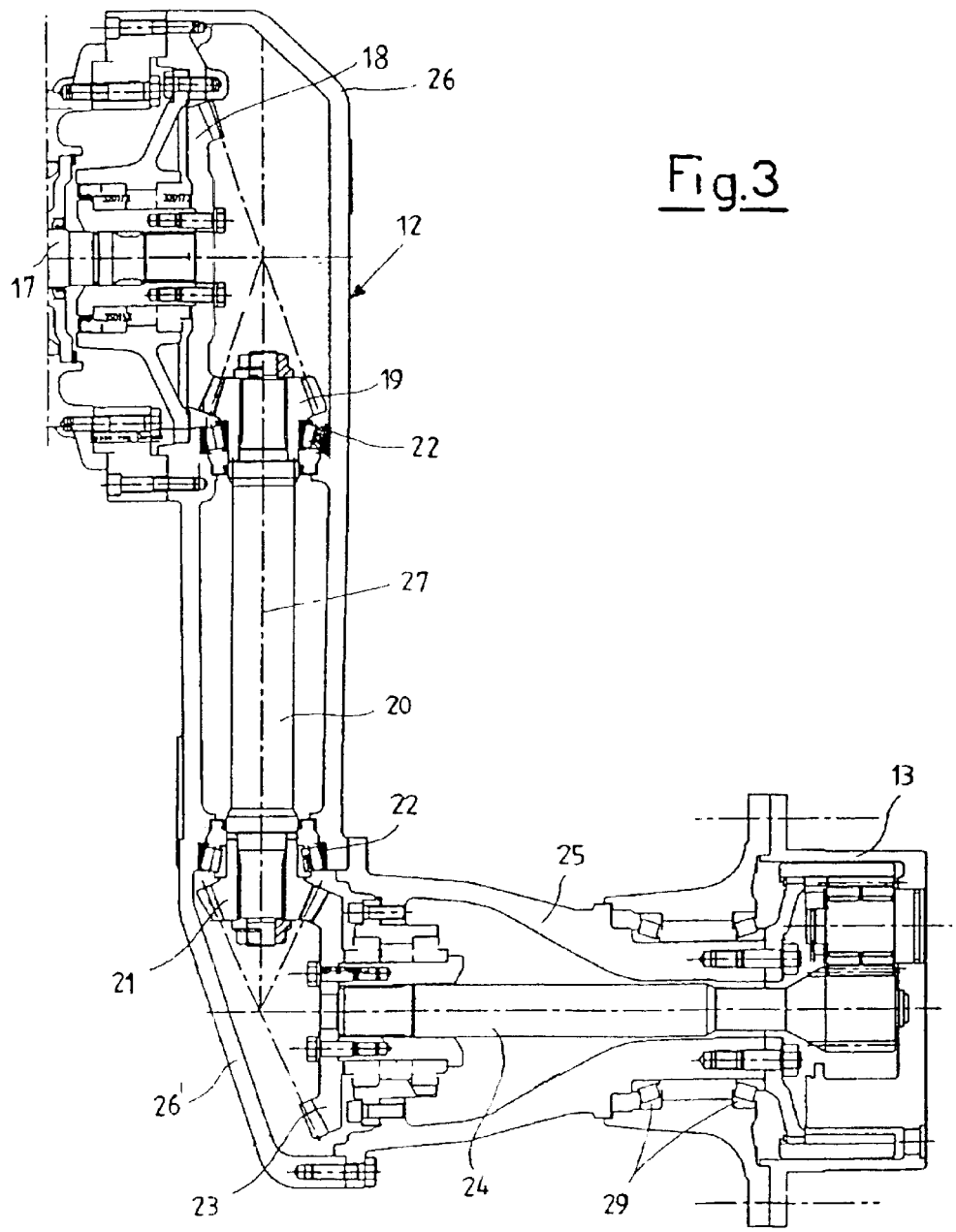
FIG. 3 is a sectional view, at an enlarged scale, of one half of the engine half trolley illustrated in FIG. 2 along the plane labeled as I according to one first embodiment.

Illustrated in greater detail in FIGS. 2 and 3 is a single engine half-trolley 10 of simplified structure, or most thereof, suitable for being used for an industrial vehicle, which is set at the side of the chassis of a vehicle (not shown).

The half-trolley 10 comprises, for instance, a casing 12 from which there come out two wheel hubs 13 for respective wheels 14, indicated by a dashed and dotted line in FIG. 2, set on the same side of the vehicle.

FIGS. 2 and 3 show a first example of embodiment of the half-trolley 10, in which the casing 12 is provided with a pair of straight arms 15 carrying the respective wheel hubs 13.

A special differential 16, represented schematically in FIG. 1, drives in rotation pairs of input shafts in the half-trolley, or half-axles 17, each of which bears, constrained to its free end, a ring bevel gear 18. Engaged on said ring bevel gear 18, on opposite sides and for each extension or arm 15 of the half-trolley 10, are two bevel pinion gears 19, each of which drives a wheel hub 13 set at the end of each of the two extensions or arms 15.

In particular, it should be noted that the bevel pinion 19 is fitted on a transmission shaft 20, which extends within the arm 15 of the casting and which carries, at its other end, another bevel pinion 21. Both of the pinions 19 and 21 are supported by bearings 22 set inside the arm 15.

Furthermore, the latter bevel pinion 21 engages with a ring bevel gear 23, which is fixed on a shaft 24 supported within an extension 25 of the arm 15 on which the wheel hub 13 rotates by means of interposition of bearings 29.

It should be emphasized that setting the various pinions and ring bevel gears inside the casing 12 of the arm 15 makes it possible to obtain an almost direct and extremely simple transmission, with the least amount of contact possible between the gears.

The presence of these pinions and ring bevel gears moreover makes it possible to keep the overall dimensions of the easing 12, of the arm 15, and of its extension 25 extremely contained. In fact, the arm 15 is provided, in its area of attachment to the central transmission and, above all, in particular in one bottom area of attachment to the extension 25, which bears the wheel hub 13, with second bevel 26 '. First and second bevels 26 and 26' in the casing 12 reduce the overall dimensions towards the inside of the vehicle and enable the vehicle provided with the said half-trolley 10 to have a greater and easier penetration, above all in muddy terrain and in situations where obstacles may be present.

The same applies as regards the extension 25 of the arms 15, which, albeit set at right angles to the arms 15, is extremely contained.

Figure 4:
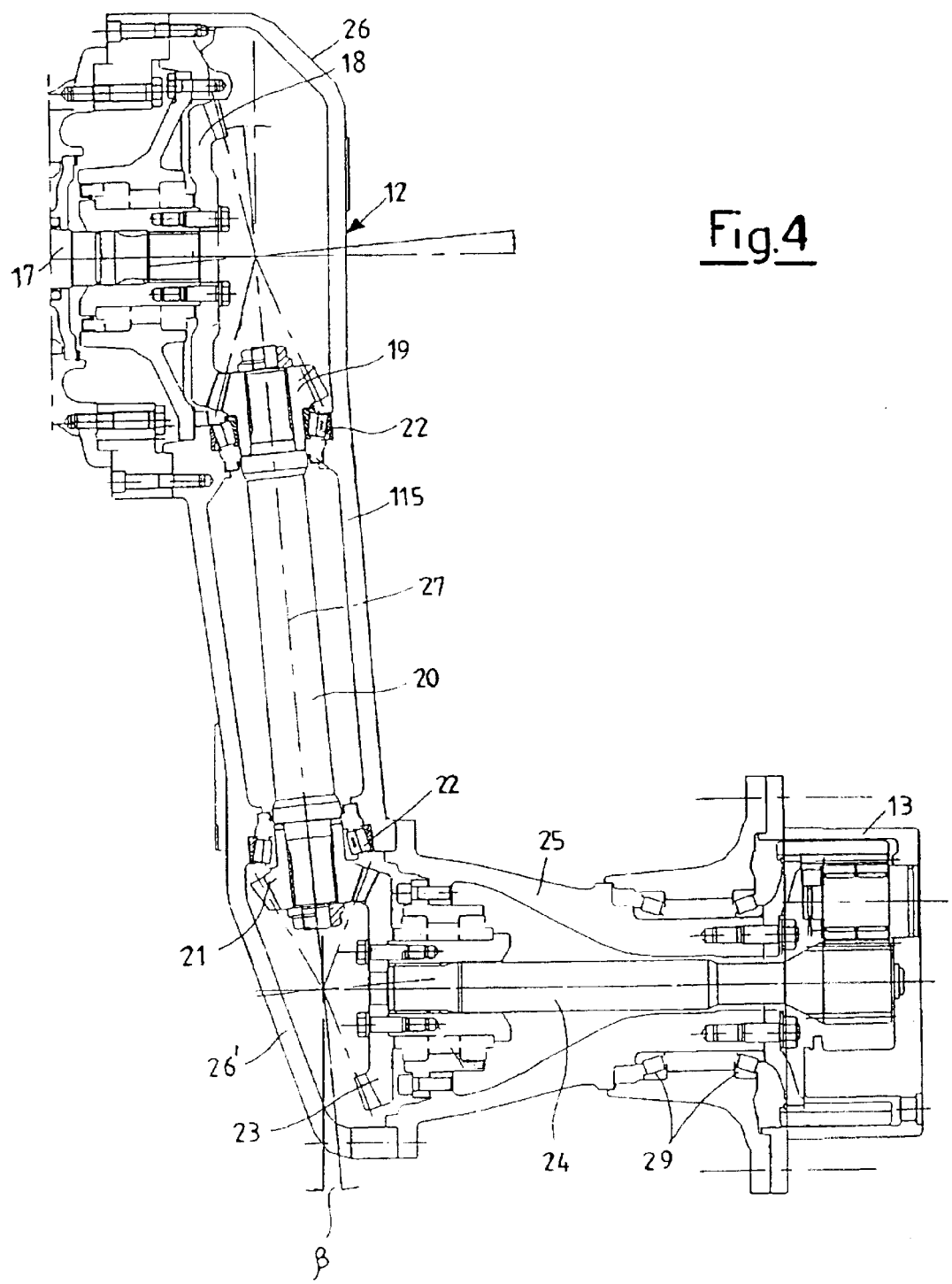
FIG. 4 is a sectional view, at an enlarged scale, of one half of the engine half trolley illustrated in FIG. 2 along the plane labeled as I in a second embodiment with inclined arms.

FIG. 4 is a sectional view of one half of an engine half-trolley according to the invention in a second embodiment. In this figure, parts that are the same as or equivalent to the ones already described are designated by the same reference numbers.

FIG. 4 shows how a casing 12 may be made with arms 115 of the casting inclined with respect to a longitudinal arrangement, envisaged in the first embodiment of FIG. 3.

It may be noted that an axis of rotation 27, along which the transmission shaft 20 is set, is inclined at an angle β with respect to the longitudinal direction, the said angle being rotated with respect to the outside of the vehicle and being between 3° and 40°, preferably approximately 15°.

In this way, an even greater capacity for penetration of the vehicle is achieved thanks to the fact that the casing of the half-trolley 10 is particularly suited for preventing or minimizing impact against obstacles of various kinds.

There is, in fact, also obtained an inclination outwards of the internal part of the arm 115, as already obtained thanks to the bevels 26, 26'.

The above-mentioned minimization of overall dimensions is made possible precisely on account of the use of bevel gear pairs in positions corresponding to the variation in direction at 90°+β of the transmission between the transmission shaft 20 and the wheel hub 13.

The presence of just two pairs of pinion and ring bevel gear moreover optimizes simplification of assembly of the parts of the transmission that drives the wheels 14, with a likewise minimal number of components.

The consequence of this is a drastically reduced mechanical resistance of total gear-meshing, with the possibility of wear of the end parts, which are exposed to sliding friction, that is likewise reduced to a minimum. In fact, the slender shape and the compactness in restricted spaces of the casing and of the transmission considerably reduces the impact and the sliding friction both on mud and against possible obstacles.

Furthermore, the invention has made it possible to obtain a gear-reduction ratio such as to reduce the effect of lifting of the front part of the half-trolley. There is therefore a better balancing of loads between the front wheels and the rear wheels of the half-trolley. This feature proves particularly favourable for forestry applications, where there frequently occur routes with continuous variation in conditions and where obstacles of a certain importance are present.

The direct transmission by means of bevel gear pairs makes it possible to keep the transmission ratio low in the half-trolley, with the consequence of a more balanced distribution of the torque between the front wheels and the rear wheels of the half-trolley, and consequently a greater mobility of the entire vehicle.

A particularly compact arrangement of this sort in restricted spaces of transmission of motion adopted on the half-trolley moreover enables smaller overall dimensions of the entire vehicle and, given the idea adopted, enables disassembly of the half-trolley, which can thus be more easily packaged, if necessary, and prepared for shipment.

The fact of minimizing the parts that make up the transmission also enables solution of the problems presented by the half-trolleys so far known, for which it was necessary to keep in store several pieces as spares, with the consequent requirement for larger storage spaces available, capital tied up in the form of said parts, and increased overhead expenses.

A half-trolley of the sort described herein, whilst maintaining the performance and functions of previously known half-trolleys adopted in vehicles up to now used, is particularly compact and simplified and provides high mechanical performance.

Described and represented herein is a half-trolley having two arms 15 connected to two wheels, but it is possible to have even just one arm and just one driving wheel in a simplified embodiment.

A half-trolley thus devised may undergo numerous modifications and variations, all of which falling within the scope of the invention. In addition, all the items may be replaced by technically equivalent ones. In practice, the materials used, as well as the dimensions, may be any whatsoever, according to the technical requirements.

What is claimed is:

1. An engine half-trolley (10) for industrial vehicles set at a side of a vehicle chassis and comprising a casing (12) from which there comes out at least one wheel hub (13) for a respective wheel (14), an input shaft (17) to said half-trolley (10) being connected to a differential (16) of the vehicle, said half-trolley further comprising an arm (15, 115) forming part of said casing (12) wherein said arm (15, 115) has at least two bevels (26, 26') a first bevel (26) located on at least one side of said arm (15, 115) in the area external to said input arm (17) and a second bevel (26') located on at least one side of said arm (15, 115) between said first bevel (26) and said wheel hub (13), wherein within said arm (15, 115) forming part of said casing (12) there is set in succession, between said input shaft (17) and said wheel hub (13), a first ring bevel gear (18), which meshes with a first bevel pinion (19) set at one first end of a continuous transmission shaft (20), said transmission shaft (20) carrying, at its second end, a second bevel pinion (21), which in turn engages with a second ring bevel gear (23) fixed on a shaft (24) connected to said wheel hub (13).

2. The engine half-trolley (10) according to claim 1 wherein said wheel hub (13) is set on an extension (25) of said arm (15).

3. The engine half-trolley (10) according to claim 1, wherein an axis of said arm (115) is inclined at an angle (β)

with respect to a longitudinal direction, said angle (β) being measured with respect to the direction of movement of said vehicle chassis.

4. The engine half-trolley (10) according to claim 3, wherein said axis of said arm coincides with an axis of rotation (27) of said continuous transmission shaft (20), which is set supported on bearings (22).

5. The engine half-trolley (10) according to claim 4, wherein said angle (β) is between 3° and 40°.

6. The engine half-trolley (10) according to claim 5, wherein said engine half-trolley (10) is provided with a pair of arms (15, 115) carrying respective wheel hubs (13), each of said arms (15, 115) being provided with two bevel-gear pairs (18, 19; 21, 23), which drive in motion a single input shaft (17) and each of which controls a wheel hub (13) for a respective wheel (14).

7. The engine half-trolley (10) according to claim 6, wherein said arm (15, 115) is a casting.

8. The engine half-trolley (10) according to claim 4, wherein said angle (β) is approximately 15°.

* * * * *